April 5, 1966 A. KASSER ETAL 3,244,207
APPARATUS AND PROCESS FOR PRODUCING WOOD CHIPS
Filed March 20, 1964 2 Sheets-Sheet 1
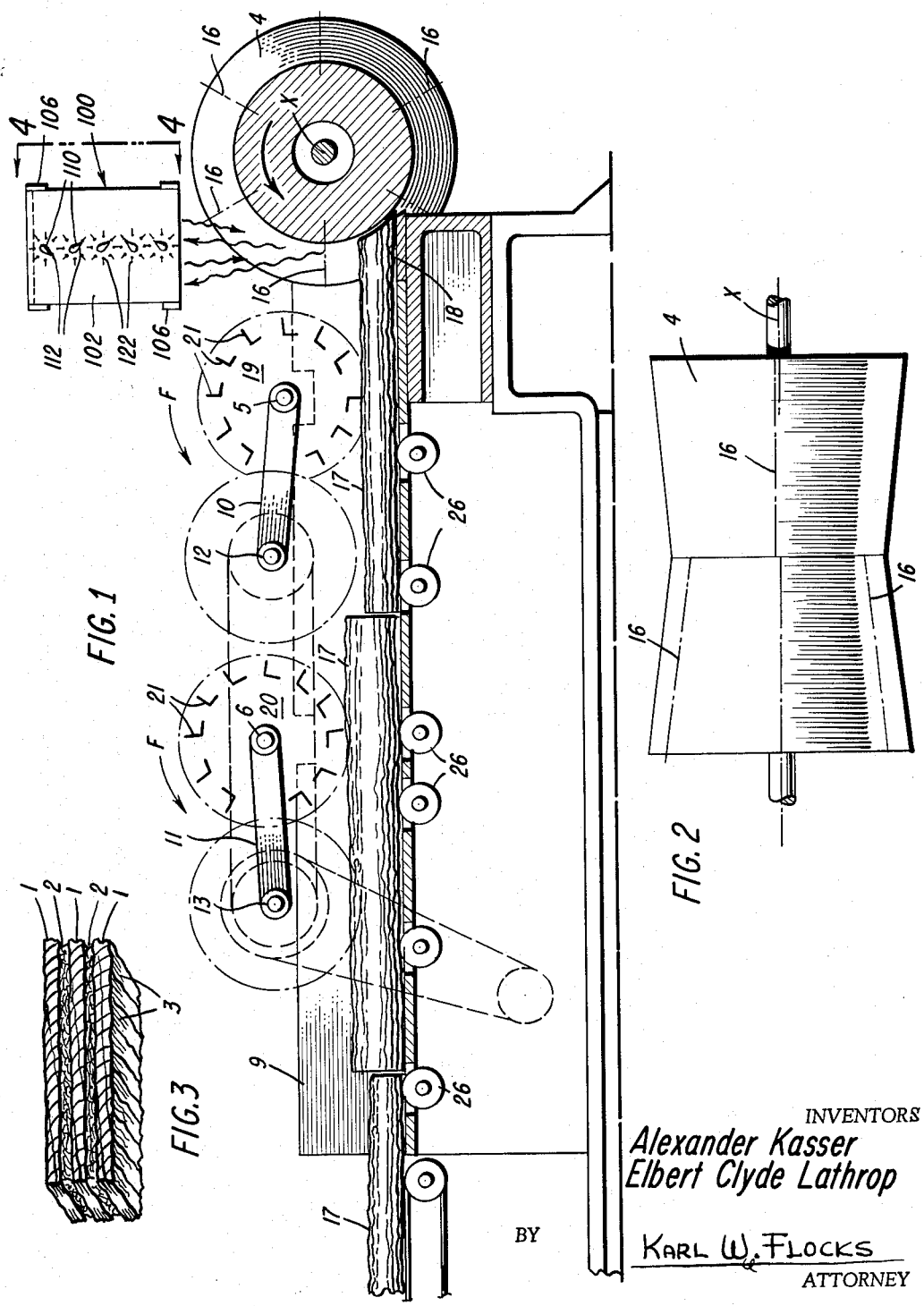
INVENTORS
Alexander Kasser
Elbert Clyde Lathrop
BY Karl W. Flocks
ATTORNEY

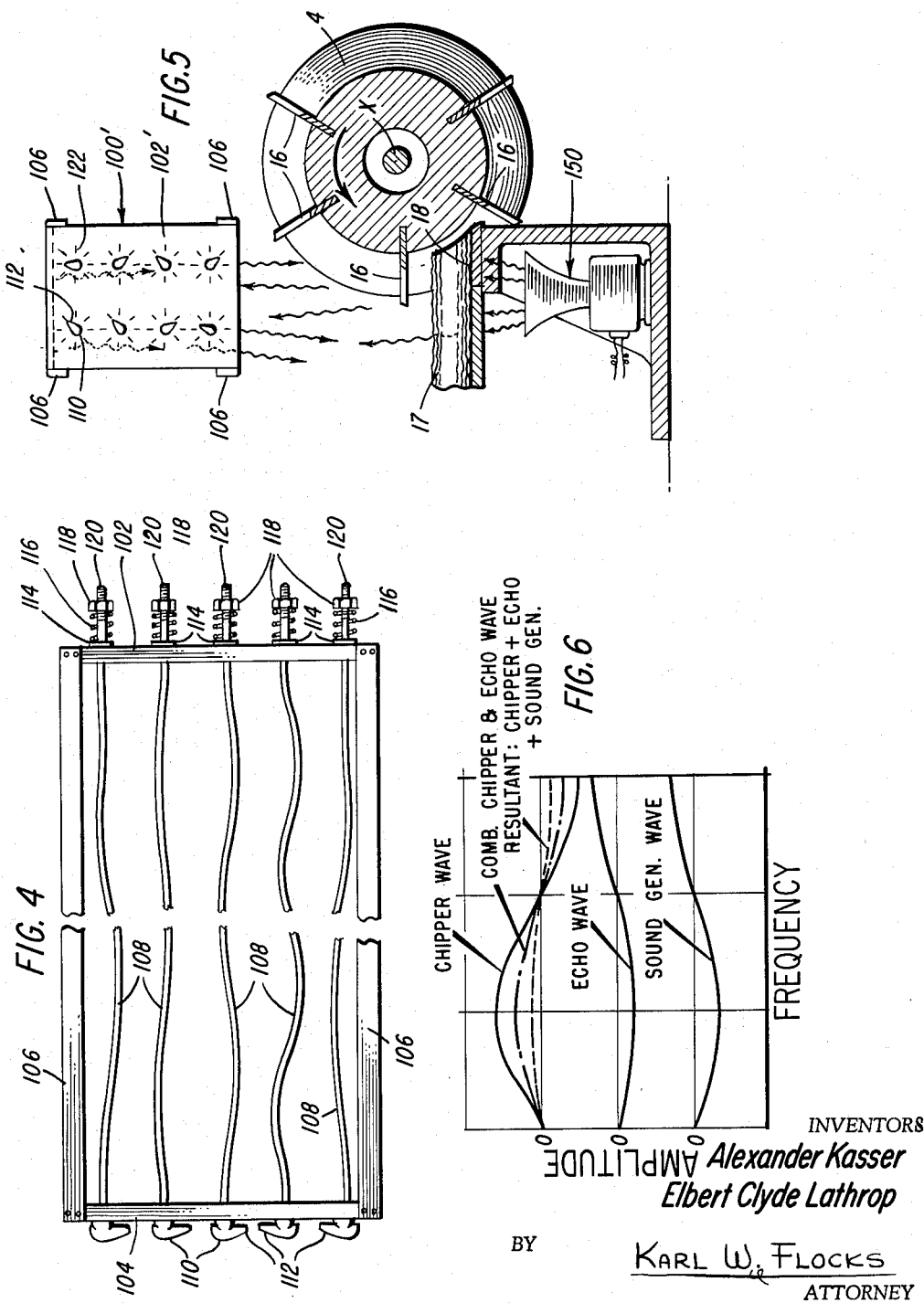

3,244,207
APPARATUS AND PROCESS FOR PRODUCING
WOOD CHIPS
Alexander Kasser, Upper Montclair, N.J., and Elbert Clyde Lathrop, 6516 Mt. Hawley Road, Peoria, Ill.
Filed Mar. 20, 1964, Ser. No. 353,472
9 Claims. (Cl. 144—323)

In the art of manufacturing pulps used for making paperboard or alpha cellulose it has been recognized for some years that when chips are produced from logs or bolts that some of the fibers within the chip have been damaged.

The result of using such chips in the manufacture of industrial cellulose is that the physical properties of the pulp so made from the chip are weaker and less useful than those made from chips which are not damaged, i.e., chips made by hand. This cause of damage has been generally thought to be due to the pressure exerted on the unchipped bolt and the shock of impact to produce the chip. It is known in the art that occasionally pulps made from known species of wood are of considerably lower quality than those from the same species chipped in the same chipper and cooked in the same manner. The reasons for the variations is generally unknown.

The invention to subsequently be described in detail may be used on apparatus of the character disclosed in United States Letters Patent #3,093,524 for producing wood chips of the general character disclosed therein.

It is the purpose of this invention to disclose a process and apparatus for producing chips of a uniform high quality.

A further purpose of the invention is to provide a novel process and apparatus which compensates for variable sonic vibrations generated during the production of wood chips.

Another object of the invention is to provide a novel process and apparatus which is applicable to known chippers presently used for the purpose of producing wood chips.

A still further object of the present invention is to provide means for controlling manually or automatically the intensity and amplitude of the sonic wave generated during producing of wood chips.

Other objects and the nature and advantages of the instant invention will be apparent from the following description taken in conjunction with the following drawings, wherein:

FIG. 1 is a longitudinal section, essentially diagrammatic, of one form of apparatus in which the principles of sound wave generation of the present method are utilized;

FIG. 2 is an elevation of the rotary cutter or chipper used in the apparatus of FIG. 1;

FIG. 3 is an enlarged view of several lamellae of a shattered wood chip shattered according to the present invention;

FIG. 4 is an enlarged side elevation of a sound generating device of "echo member" used in the production of chips in the present invention;

FIG. 5 is a view similar to the right-hand portion of FIG. 1 showing a supplementary sound generating device used in conjunction with the sound generating device of FIG. 1; and FIG. 6 is a graph illustrating comparatively the different sound waves generated and the resultant controlled waves.

Referring to the drawings in detail, and first considering FIG. 3, a fragmentary portion of a wood chip comprises lamellae 1 interconnected at random zones by bundles of fibers 2. The lamella 1 includes component fibers 3 which are separated into a relatively porous matrix while remaining interconnected, thereby constituting the lamalla proper, which gives the appearance of a coherent porous body of partially disaggregated wood fibers.

This type of chip and the manner in which it is used is described in detail in U.S. Letters Patent #3,093,524 and reference may be had thereto for particular details of the type of wood chip involved and the uses to which it is put.

As described in the aforementioned issued patent, wood is preferably fed in the longitudinal direction of its component fibers toward the cutting machine. The preferred cutting machine, as described in the aforementioned patent, is of the rotary cutter type, i.e. the machine carrying cutter blades mounted on a rotary member. Preferably, the wood is firmly maintained against the rotary member when the blade is rotated at a relatively high speed. Referring to FIGS. 4 and 5, the rotary member or drum of the chipping apparatus is indicated at 4.

The apparatus preferably includes a horizontal channel 9 perpendicular to a vertical plane passing through an axis X of the rotary member or drum 4. The channel 9 comprises (depending upon its length) a plurality of rollers 26 extending transversely of the bottom of the channel to support the different lengths of wood 17 being moved toward an anvil 18 where they will be chipped by blades of the drum 4 projecting radially from the periphery of the drum 4. Preferably, the distance between the edge of the anvil 18 and the blades 16 is only sufficient to allow for a working clearance, i.e. it is at a minimum.

Functioning in conjunction with the rollers 26 are one or more rollers 19 and 20 which extend transversely of the channel 9 and include radially projecting spikes 21 thereon. The spikes 21 are capable of engaging in the wood 17 for the purpose of moving or pulling the wood through the channel 9. The rollers 19 and 20 provide means for feeding the wood through the channel 9 as well as constraining the wood in the channel 9.

The rollers 19 and 20 are independently operable in order to accommodate several logs or pieces of wood 17 which have different diameters. The rollers 19 and 20 are respectively mounted on shafts 5 and 6, supported on spaced arms 10 and 11, respectively, and are rotated in the direction indicated by direction arrows F. The arms 10 and 11 are mounted on transverse shafts 12 and 13, respectively, and a suitable drive is provided to rotate the wheels 19 and 20 in the direction indicated.

The exact nature of the drive is described in detail in U.S. Letters Patent #3,093,524 and thus additional description of the exact nature of the chipping apparatus is not believed to be necessary.

Indicated generally at 100 is a sound generating source conveniently described as an "echo box." The echo box 100 comprises a substantially skeleton-like frame including opposed end plates 102 and 104 connected at the corners by frame elements 106. Extending between the end plates 102 and 104 is a plurality of material sound generating bars 108 of steel or any other suitable material which have a general concave-convex curvature as seen in FIG. 4. The bars 108 extend through and are journaled in suitable apertures of bore portions in the plate 104 and include externally thereof a radially extending head 110 having a pointer portion 112. The other ends of the bars 108 extend through suitable apertures in the end plate 102 and have washers 114 circumposed thereabout and in engagement with the outer surface of the end plate 102. Circumposed about the other ends of the bars 108 in engagement with the washers 114 are compression springs 116 engaged by a nut 118 mounted on the threaded end 120 of the bars 108.

Considering FIG. 1, end plate 102 has circumposed about the head 110 of the sound generating bars 108 indicia 122 uniformly spaced and preferably numbered in order to aid in recording the optimum position or location of the sound generating bars 108 for the purpose of producing a sound of a particular wave length.

The sound generating box will generally be located as close as possible to the origin of vibration, i.e. the chipper drum or rotary member 4, and will reflect an "echo" wave back toward the original source. Theoretically, the chipper drum will be rotating at a predetermined number of revolutions per minute and will sever the lamina of the log and the fibers or the connecting fibers will be separated from the various layers of the chip. The effect of the chipping blade on the log will result in an application of pressure which does not necessarily produce uniform chips. It is highly desirable to avoid any damage to the fibers of the wood being cut, independently of the speed at which the cutter is operated.

Considering for the moment a single blade of the chipper drum 4, when the blade strikes the log, the sound identified as "chipper wave" in FIG. 6, originates and generally has a sine curve of a particular frequency. This sound wave generated by single blade is partially absorbed by the echo box. When this occurs, a secondary wave identified as "echo wave" is reflected by the sound box 100. The two waves have the same frequency but different amplitudes and provide a total effect of dampening or smoothing out the originally generated sound wave occurring when the blade initially struck the log. Accordingly, the resultant wave shown in FIG. 6 and identified as "Comb. Chipper and Echo Wave" will comprise a sine curve of a lower amplitude. This resultant wave will be such to minimize damage to the fibers of the chips produced.

It was observed that the vibration cycle needed to separate lignin bond from the cellulose fiber is generally the same for all woods originating from the same area and being cut at the same time. This fact is of considerable interest inasmuch as due to different densities of wood coming from different areas, different vibration cycles had to be used in order to obtain the desired fiber separation that desirably conserves the original quality of the fiber.

This phenomena allows, as it was observed during operation, that the uniform chipping of heterogeneously assorted timber species, i.e. twenty-nine species varying from 0.4 to 1.3 in density, and originating from the same tropical force, were mechanically vibrated in "an ultrasonic" chipper, heterogeneously fed to the chipper and all of them retained the same fiber characteristics as, when separately vibrated (chipped), however, they changed their physical properties when the vibration cycle was changed. It was further observed, that when the vibration cycle changed for the same species, it either caused a lesser fiber separation, i.e. lignin bond separation, completely destroyed the fibers depending upon whether the cycle had been increased or decreased.

Utilizing the observation of lignin behavior, it became apparent to researchers that a practical approach could be derived to the method of separating lignin in fibers. Through the different vibration of the chipper, thus, the variation of the cycles, needed for best chipping various species could be (electronically and) automatically controlled so that for various species the right cycle of vibration could always be obtained.

During the early development of the chipper disclosed in U.S. Patent #3,093,524, French hardwoods consisting of mixed species of oak, beech, maple, ash, and birch were chipped and converted into semi-bleached cold soda pulp. The pulping process consisted in spraying the chips with 7% caustic soda solution, allowing 10 minutes' time for penetration of the caustic, followed by passage through a press under heavy pressure, disc refining, screening, washing, bleaching with hydrogen peroxide, forming into sheets on a forming machine and baling the sheets. This procedure was standard. The chipper at this time was used for short periods of operation and conditions of operation were varied somewhat to make observations. It was noted that the physical characteristics of the pulps so made varied considerably from batch to batch as indicated by the typical results below:

| Freeness, SR | Tensile Meters | Burst Factor | Tear Factor | Brightness, GE |
|---|---|---|---|---|
| 65 | 5,925 | 29.5 | 53 | 71.5 |
| 60 | 3,445 | 14.7 | 36 | 67.5 |
| 54 | 4,705 | 20.8 | 51 | 70.5 |
| 63 | 4,150 | 18.0 | 40 | 67.5 |
| 62 | 3,930 | 15.8 | 37 | 65.5 |
| 61 | 4,127 | 23.5 | 48 | 66.0 |
| 66 | 4,880 | 25.4 | 42 | 74.5 |

With the discovery of this variation in pulp characteristics due to uncontrolled operation of the chipper, steps were taken to obtain control. This consisted in determining the rotor speed under set conditions of rate of feed, compression on bolts at feed, thickness of chip, as related to wood characteristics which conditions would produce optimum conditions of fiber separation in the chip, without altering the natural fiber characteristics in any damaging manner. The following results are typical of the pulp characteristics of cold soda pulp made from controlled chipping of the above mixture of hardwoods:

| Freeness, SR | Tensile Meters | Burst Factor | Tear Factor | Brightness, GE |
|---|---|---|---|---|
| 64 | 4,480 | 22 | 61 | 65 |
| 66 | 5,095 | 26 | 60 | 68 |
| 64 | 5,105 | 27 | 55 | 66 |
| 70 | 4,700 | 20 | 46 | 67 |

The following results show the influence of species on pulp characteristics of cold soda pulp made from chips produced under conditions of control from a mixture of 40% ash, 25% oak, 13% elm and 22% mixed:

| Freeness, SR | Tensile Meters | Burst Factor | Tear Factor | Brightness, GE |
|---|---|---|---|---|
| 63 | 6,300 | 31.1 | 67 | 70 |

The following examples show that with a chipper provided with an "echo box" vibration cycle control, fibers can be damaged if control measures are not checked with requirements. Lots of chips made from the same bolts of American pine wood were produced on the chipper of U.S. Patent #3,093,524 and on the same chipper having "echo box" control. These chips were pulped under identical conditions by the acid sulfite process. Yields of pulp and paper making characteristics of the pulps were determined as follows:

| | Conventional Chips | "Echo Box" Chips |
|---|---|---|
| Percent Yield-screened pulp | 55.1 | 54.8 |
| Percent Screenings | 1.2 | 0.5 |
| Freeness SR | 53 | 53.0 |
| Burst Factor | 77 | 78 |
| Tear Factor | 57 | 55 |
| Tensile meters | 11,382 | 11,170 |
| Permanganate No | 19.8 | 17.7 |

Somewhat later two other bolts of American pine woods were chipped by the conventional chipper and the one controlled by an "echo box" as before, and were pulped by the acid sulfite method under identical conditions as with the first series. The results follow:

|  | Conventional Chips | "Echo Box" Chips |
|---|---|---|
| Percent Yield-screened pulp | 54.8 | 53.5 |
| Percent Screenings | 3.1 | 1.4 |
| Freeness S.R. | 67 | 73 |
| Burst Factor | 79.8 | 73.3 |
| Tear Factor | 61 | 51.5 |
| Tensile meters | 11,332 | 10,044 |
| Double folds | 3,112 | 1,834 |
| Permanganate No. | 23.7 | 20.3 |

It will be noted that the pulp made from the "echo box" chips in this instance is of lower physical characteristics than the pulp from the chips in the first instance and is also lower than either of the pulps from conventional chips. On the other hand the characteristics of the pulps made from the two lots of conventional chips are very close in properties. A microscopic examination of the chips from the 1st and 2nd "echo box" lots showed that the fibers in the second lot had been damaged during the chipping operation.

We have discovered that the desirable vibration cycle under controlled conditions of chipping is the same for woods originating in the same area and cut at the same time, although these may differ in density. But with woods of different density coming from different areas different vibration cycles are required to obtain fiber separation that conserves the original quality of fiber. For example, in "echo box" chipper operations in chipping under controlled conditions, 29 species of tropical hardwoods varying in density from 0.4 to 1.3, the woods being chipped heterogeneously with the same vibration cycle, the mixed chips retained the same separation of fibers, the same fiber and pulp characteristics as were produced by chipping the respective species at the same vibration cycle control. It was further observed that when the vibration cycle control was changed for the same species it either resulted in a less good separation of the fibers in the chip, or more or less damaged fibers, depending on whether the vibration cycle had been increased or decreased.

A study was made of the vibration characteristics of the "echo box" chipper when idling, when producing 8 mm. thick chips from hard and from resinous wood, and 14 mm. thick chips from these same woods. The procedures were briefly as follows: For sound frequency characteristics an electrostatic microphone with an amplifier and spectrometer were used. The spectrometer was provided with a number of filters (⅓ octave) in stages which permitted successive frequency measurements at the level of each band of frequency associated with each filter. The microphone was placed 80 cm. from the cover of the chipper.

For determining vibrations a receiver containing a piezo-electronic relay and millivolt meter was used. The receiver was placed on the end of the rotor shaft and registered vertical vibrations. Frequencies of sound and vibrations were also determined using an oscillograph. During the tests the rotor had a diameter of 80 cm. and was furnished with four series of eight knives placed in a quincunx pattern. The speed of the rotor was measured to be 300–310 r.p.m.

Results of the piezo-electric test follow. Amplitude is measured in mu($\mu$), speed of vibration mm./sec., acceleration m./sec.$^2$.

| Conditions Test | Amplitude, Mu | Speed mm./s. | Acceleration m./s.$^2$ |
|---|---|---|---|
| Chipper idle | 1.5 | 0.8 | 15 |
| Producing 8 mm. thick hardwood chips | 30 | 6 | 35 |
| Producing 14 mm. thick hardwood chips | 500 | 50 | 40–50 |

The difference in the conditions of vibration when making 8 mm. thick and 14 mm. chips is self-evident.

*Information obtained by use of oscillographs*

| Conditions Operation | Thickness Chip | Type Wood | Characteristic Measured | Dominant Frequencies Hz |
|---|---|---|---|---|
| Idle | | | Acceleration | 2700:1550 |
| | | | Speed | 1970:4800 |
| | | | Amplitude | 370:4200 |
| | | | Air noise | 180 |
| Chipping | 8 mm | Hard | Acceleration | ($^1$) 3400:2900 |
| | | | Amplitude | 4500:3200:6500 |
| | | | Air noise | 110:92 |
| | | Resinous | Acceleration | 4000 |
| | | | Speed | 5500:2900 |
| | 14 mm | Hard | Acceleration | 3800 |
| | | | Speed | 6650 |
| | | | Amplitude | 400:6400 |
| | | Resinous | Acceleration | 86 |
| | | | Speed | 6450 |
| | | | Amplitude | 345–6500 |
| Shock on knife | 8 mm | | Air noise | 78 |
| | 14 mm | | do | 6500 |
| | | | | 7100 |

$^1$ Poorly defined.

The difference in amplitudes when producing 8 mm. and 14 mm. chips and between hard and resinous woods is to be noted.

The above-described apparatus is utilized as follows:

A log from a batch is run through the machine and the chips obtained are pulped and the pulp characteristics are ascertained. Then the bars are rotated about their longitudinal axis, and recordings are kept as to the number of revolutions per minute of the chipper blade and the exact location of the bars, i.e. the bars can be numbered in the "echo box" of FIG. 1 from No. 1 to 5 and the indicia disposed about the pointer portion 112 of the head of the rods will have identification symbols such as numbers 1–10, for example. The test data is recorded, and it is finally ascertained the particular speed, and the location of the bars which afford the proper resonance with respect to the generated vibration or sound of the chipper that will provide uniform chips producing the necessary quality of pulp.

Thereafter, the entire batch of wood, whether it is hard or soft wood, can be chipped utilizing a rotor speed and particular setting of the sound box wherein the internal fibers of the chips will not be damaged and thus adversely affect the quality of the pulp to be produced from the chips.

Considering FIG. 5, a slightly modified sound box or "echo box" is indicated generally at 100'. This sound box is located in substantially the same position as that indicated at 100' in FIG. 1. However, the sound box 100' includes a larger number of sound bars than is incorporated in the previously described embodiment.

Indicated generally at 150 is a sound generating device of suitable character which will produce counteracting sound waves to dampen or counteract those waves generated by chipper operation and reflection from the sound box 100'.

The supplementary sound generating means 150 will be utilized when the capacity of the sound box 100' is not great enough to effectively produce uniform wood chips.

If the sound waves generated by the "echo box" 100' in spite of the different oriented positions of the sound bars are not sufficient to produce the optimum wave length to dampen out undesirable sounds generated at the chipper, and affecting the quality of the chips produced, the supplementary sounds are generated at the source 150.

It is contemplated that due to dimensional restrictions, for example, the "echo box" will not be effective to generate a sound wave which will effectively dampen the sounds produced at the chipper. These conditions will probably occur at especially high speeds and particularly when hard or dense woods are being chipped, or this might possibly occur when very soft woods are being chipped and there is very little resistance to movement of the chipping blade through the wood.

Considering FIG. 6 again, as indicated diagrammatically the "echo wave" and the "sound generator wave" and by means of dotted lines there is indicated the "resultant chipper+echo+sound generated" wave which has a relatively low amplitude and thus the harmful high amplitude sound wave that might occur due to the absence of the "secondary" sound wave reflected from the "echo boxes" 100 and 100' will have the final effect of producing a chip in which the internal fibers of the chip are not damaged by the sound waves generated at the chipper, in the absence of the secondary and supplementary generated sound waves.

Putting it in another manner, with a recognition of the theoretical effect of sonic waves on the production of wood chips, it was found that the following process could be utilized to produce chips of a uniform quality.

In order to produce a high grade chip it is necessary to determine the character of the sonic wave most favorable to high grade chip production. In order to establish the character of this sonic wave for any given species, chips were produced from the same wood at different speeds of the rotary cutter. The chips so produced are then converted into chemical pulp by the standard process, and the physical properties of the pulp so produced were compared with the properties of highest grade pulps produced from conventional chips of the same species.

At that rotor speed at which the most uniform and highest quality chips were produced, it is found, the best level of sonic wave generation is also determined, since the chipper, depending on the speed of the rotor, generated during chipping sonic waves of a wide range of intensity and amplitude.

After having ascertained the optimum speed of the chipper which would produce the chip affording the best quality pulp for the particular purpose required, the operator of the apparatus is then able to maintain the particular speed of the chipper blades, accordingly affording a sonic wave generation of a frequency and amplitude lower than that which would produce undesirable chips, to thus afford the best quality pulp from the particular species of stock being chipped.

In the commercial production of pulp chips, it is desired to operate the chipping apparatus at its maximum principal speed. These maximum speeds of operation may frequently produce a sonic wave of amplitude and frequency which exceeds that ascertained as the optimum speed for producing the best pulping chip. Accordingly, it is necessary to have means for dampening this wave from higher amplitude and frequency down to that which is optimum for the particular species of wood being chipped. We have discovered that this can be done by the introduction of a "sound box" located at a suitable point in the chipper and so provided with adjustable means for absorbing and/or dampening and reflecting sound waves so that the sound wave produced during maximum speed of operation of the chipper will be leveled off within the limits previously ascertained to produce the highest quality pulping chip.

Although the invention is described in conjunction with preferred embodiments, particularly with respect to the installation for producing secondary and supplementary sound waves, it is to be understood that modifications and variations may be resorted to without departing from the spirit and scope of the invention, as those skilled in the art will readily understand. Such modifications and variations are considered to be within the scope of the invention as set forth in the appended claims.

What is claimed is:
1. A method of producing wood chips comprising:
    (A) moving a log of wood into a rotary chipper blade operating at a predetermined r.p.m. producing a sound wave of amplitude normally adversely affecting the fibers of the wood chips;
    (B) simultaneously generating a secondary sound wave having a negative amplitude with respect to the first generated sound wave to dampen the first generated sound wave; and
    (C) producing a resultant sound wave of an amplitude below a value which will adversely affect the fibers of the wood chips produced.
2. The method of claim 1 including:
    (D) producing the secondary sound wave as a reflected wave of the sound wave first generated whereby the chipper blade engaging a log of wood during rotation is the source of said secondary sound wave.
3. The method of claim 1 including:
    (D) producing a supplementary sound wave having a negative amplitude to combine with that first generated whereby said secondary and supplementary sound waves have a combined amplitude dampening the first generated sound wave.
4. The method of claim 3 including:
    (E) producing the secondary sound wave as a reflected wave of the sound wave first generated whereby the chipper blade engaging a log of wood during rotation is the source of said secondary sound wave.
5. For use with good chipping apparatus, a sound generating box comprising a housing, and sound generating means in said housing for reflecting sound waves having a negative amplitude with respect to those generated by said chipping apparatus.
6. The structure of claim 5 in which said sound generating means comprises a plurality of sound bars adjustably mounted in said housing.
7. Apparatus for producing wood chips comprising log conveying means including a log-receiving channel, chipper blade means at one end of said log-receiving channel for engaging the end of the log and producing chips therefrom, and sound generating means adjacent said chipper blade means for producing sound waves dampening the sound waves generated by engagement of the chipper blade means with the log during the production of chips.
8. Apparatus as set forth in claim 7 including supplementary sound generating means adjacent said first-mentioned sound generating and chipper blade means for producing a resultant sound wave with said first-mentioned sound generating means dampening sound waves generated by said chipper blade means.
9. The apparatus of claim 7 in which said sound generating means comprises sound generating bars for producing reflected sound waves.

No references cited.

WILLIAM W. DYER, Jr., *Primary Examiner.*

R. J. ZLOTNIK, *Assistant Examiner.*